(12) United States Patent
Roblek et al.

(10) Patent No.: US 9,384,273 B1
(45) Date of Patent: Jul. 5, 2016

(54) COMPRESSED PATCH FEATURES FOR AUDIO FINGERPRINTING

(71) Applicant: Google Inc., Mountain View, CA (US)

(72) Inventors: Dominik Roblek, Mountain View, CA (US); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 434 days.

(21) Appl. No.: 13/827,127

(22) Filed: Mar. 14, 2013

(51) Int. Cl.
*G06F 17/00* (2006.01)
*G06F 17/30* (2006.01)
*G10L 19/02* (2013.01)

(52) U.S. Cl.
CPC ........... *G06F 17/30743* (2013.01); *G10L 19/02* (2013.01)

(58) Field of Classification Search
CPC .......... G06F 17/3002; G06F 17/30743; G06F 17/30758; G10L 17/26; G10L 19/00; H04H 60/37; H04H 60/58
See application file for complete search history.

(56) References Cited

U.S. PATENT DOCUMENTS

2006/0122839 A1* 6/2006 Li-Chun Wang et al. ..... 704/273

OTHER PUBLICATIONS

U.S. Appl. No. 13/435,700, filed Mar. 30, 2012.
U.S. Appl. No. 13/670,453, filed Nov. 6, 2012.

* cited by examiner

*Primary Examiner* — Andrew C Flanders
(74) *Attorney, Agent, or Firm* — Fenwick & West LLP

(57) ABSTRACT

Systems and methods are provided herein relating to audio matching. In addition to interest points, localized patches surrounding interest points can be used as additional discriminative information. The patches can be compressed to increase scalability while retaining discriminative information related to the localized region within the patch. Compressed patches related to interest points of an audio sample can be compared to compressed patches related to interest points of a reference sample to determine whether the two samples are a match.

22 Claims, 10 Drawing Sheets

COMPRESSED PATCH FEATURES FOR AUDIO FINGERPRINTING

TECHNICAL FIELD

This application relates to audio matching, and more particularly to generating and using a compressed patch around interest points.

BACKGROUND

Audio matching provides for identification of a recorded audio sample (e.g., an audio track of a video) by comparing the audio sample to a set of reference samples. To make the comparison, an audio sample can be transformed to a time-frequency representation of the sample (e.g., by using a short time Fourier transform (STFT)). Using a time-frequency representation, interest points that characterize time and frequency locations of peaks or other distinct patterns of a spectrogram can be extracted from the audio sample. Descriptors can be computed as functions of sets of interest points. Descriptors of the audio sample can then be compared to descriptors of reference samples to determine identity of the audio sample.

In a typical descriptor audio matching system, interest points uniquely characterize an audio signal; thus, there is likely little overlap between interest points of two different segments of the audio sample. When comparing descriptors of an audio sample to tens of millions of reference descriptors in a reference index, multiple potential matches can be identified during the comparison. Potential matches can be validated using a more precise measurement of interest point overlap. For example, identified interest points of the audio sample can be compared to known interest points in potential matching reference samples to validate whether the audio sample and the reference sample are a match or instead a false positive. However, in a voluminous database of tens of millions of reference samples, there may still be multiple reference samples with a relatively high degree of overlap of interest points, hampering the validation process.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an input component receives an audio sample. A spectrogram component generates a spectrogram of the audio sample. An interest point detection component generates a set of interest points based on local maxima over respective time/frequency windows of the spectrogram wherein interest points in the set of interest points are associated with a time and frequency position. A patch component determines respective patches of the spectrogram associated with respective interest points in the set of interest points. A compression component compresses respective patches associated with respective interest points in the set of interest points into a set of pixels. In one implementation, a quantization component can normalize and quantize the set of pixels based on a fixed number of bits. A matching component can identify the audio sample based on comparing respective interest points and associated sets of compressed patches of the audio sample with sets of interest points and associated sets of compressed patches related to a set of reference samples.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
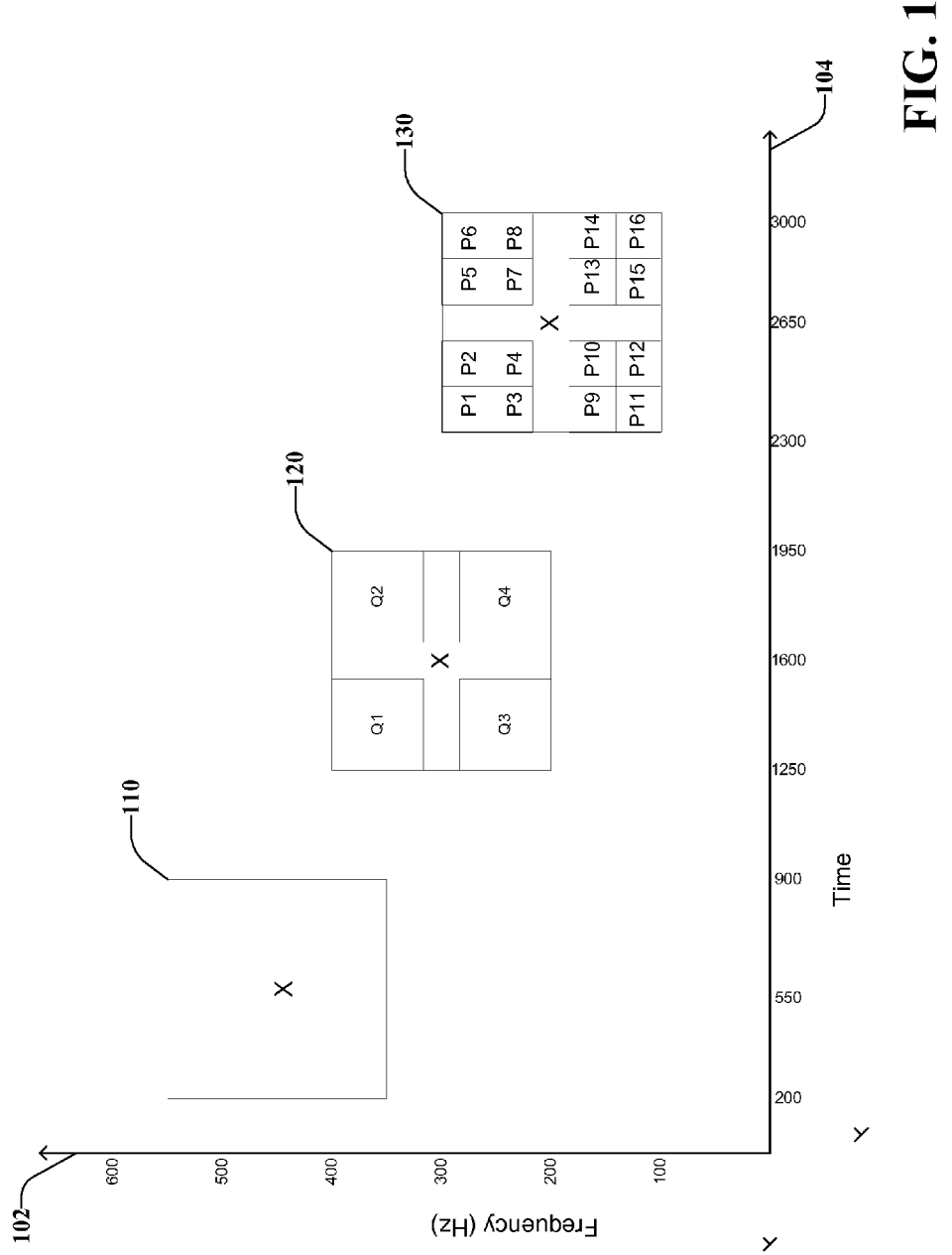
FIG. 1 illustrates an example time frequency plot of interest points and associated patches in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure amplitude of the set over time. A spectrogram can be created by combining respective measurements over time on a frequency axis to generate a spectrogram image of frequency amplitudes over time.

A second technique involves using the short-time Fourier transform ("STFT") to break down an audio sample into time windows, where respective windows are Fourier transformed to calculate magnitude of the frequency spectrum for the duration of each window. Combining a plurality of windows side by side on a time axis of the spectrogram creates an image of frequency amplitudes over time. Other techniques, such as wavelet transforms, can also be used to construct a spectrogram.

Creating and storing in a database an entire spectrogram for a plurality of reference samples can use vast amounts of storage space and affect scalability of an audio matching system. Therefore, it can be desirable to instead calculate and store compact descriptors of reference samples versus an entire spectrogram. One method of calculating descriptors is to determine individual interest points that identify unique characteristics of local features of the time-frequency representation of the reference sample. Interest points should uniquely characterize the audio signal. For example, there should be little overlap between interest points of two different segments of audio. Descriptors can then be computed as functions of sets of interest points. Descriptors of an audio sample can then be compared to descriptors of reference samples to determine a match of the audio sample.

When comparing descriptors of an audio sample to tens of millions of reference descriptors in a reference index, multiple potential matches can be identified during the comparison. Potential matches can be validated using a more precise measurement of interest point overlap. Interest point overlap provides for using interest points of the audio sample and comparing those interest points to known interest points in potential matching reference samples to validate whether the audio sample and the reference sample are a match or instead whether the reference sample is a false positive match. Interest point overlap can be based on an amount of interest points of the probe segment that overlap with the reference segment, an amount of interest points in the reference segment that overlap with the probe segment, or a combination of both. However, in a large database of tens of millions of reference samples, there may still be multiple reference samples with a relatively high degree of overlap of interest points, confusing the validation process. Thus, identifying additional features related to interest points of the audio sample that can be compared to features of reference samples to validate identity of the audio sample is desirable.

Systems and methods herein provide for generating and using a compressed patch feature for individual interest points in assessing interest point overlap. The compressed patch can be computed from a patch around individual interest points. The patch is highly compressed which allows an audio matching system with millions of references and billions of associated interest points to store associate the compressed patches with the billions of interest points related to the reference samples. First, a set of interest points can be generated based on local maxima over respective time/frequency windows of the spectrogram wherein interest points in the set of interest points are associated with a time and frequency position. Patches of the spectrogram around individual interest points can be associated with respective interest points in the set of interest points. The patches can then be compressed into a set of pixels, and through normalization and quantization, the set of pixels can be further compressed, in one example, to eight bytes for each patch. An audio sample can then be identified based on comparing respective interest points and associated sets of compressed patches of the audio sample with sets of interest points and associated sets of compressed patches related to a set of reference samples.

Referring now to FIG. 1 there is illustrated an example time frequency plot of interest points and associated patches in accordance with implementations of this disclosure. FIG. 1 depicts time (units) on a horizontal axis 102 and frequency (Hz) on a vertical axis 104. FIG. 1 depicts three example patches: 110, 120, and 130. Each depicted patch has an "X" marked at the center of the patch denoting the location of an associated interest point that has been concurrently or previously generated. For example, the patch 110 has an interest point X at time 550 ms and frequency 450 Hz. A patch is a fixed area of the spectrogram which is centered on each interest point. In one implementation, height or frequency dimension of the patch can be based on the frequency of the interest point. For example, in one implementation, height of the patch can be the frequency of the interest point divided by ten. It can be appreciated that by making the patch size proportional to the frequency of the interest point, the patch can be more resistant to pitch related distortions. In FIG. 1, the three patches (110, 120, and 130 respectively) have a fixed width and height. The example dimensions of each patch are 700 ms and 200 Hz.

Patches 110, 120, and 130 are depicted at various stages of compression. For example, patch 110 is an uncompressed patch of the entire patch area surrounding the interest point. It can be appreciated that the patch data relates to the spectral energy within frequency and time dimensions of the patch, as generated by the spectrogram. However, as patches are generated for many interest points relating to an audio sample, and millions or billions of interest points related to interest points of reference samples, it is desirable to compress the patch into as small of a storage footprint as possible while still retaining discriminative information related to the patch area.

Patch area 120 depicts the patch area being separated into four quadrants: Q1, Q2, Q3, and Q4. The middle frequency range and the middle time range have been excluded from each of the four quadrants. It can be appreciated that these middle rows and columns of the patch area are more likely to be heavily influenced by spectral energy related to the original interest point, as interest points themselves are likely peaks of spectral energy. Thus, the spectral activity associated with the area near the interest point but less directly influenced by the spectral energy of the individual interest points can be more discriminative for matching purposes. In the depicted example, the middle 37.5 Hz and the middle 129 ms surrounding the interest point are removed from the four quadrants of the patch that are to be compressed. It can be appreciated that size of the middle rows and columns of the patch area that are removed from compression can vary in alternate implementations.

Patch area 130 depicts the four quadrants of the patch area being subdivided into 4 pixels per quadrant. The patch area can be represented by sixteen pixels, e.g., P1-P16 as depicted.

The spectral energy values for each pixel can then be normalized so that the minimum value is zero and the maximum value is one. The normalized values can then be quantized into a fixed number of bins, for example, using sixteen bins for each pixel. Using this example, each pixel can be encoded using four bits, allowing for a four by four patch of sixteen pixels to be stored in eight bytes. It is to be appreciated that the quadrants of patch 120 or the entire patch area of 110 can also be subdivided into more or less pixels under varying implementations of the subject disclosure.

Compressed patches can be compared to other compressed patches using a similarity score. For example, one similarity function that can be used for comparing two patches is the correlation measure. This gives a measure in the range of [−1, 1]. By using a max(0, correlation) any similarity value below 0 can be eliminated. Patches associated with interest points of an audio sample can be compared to patches associated with interest points of a reference sample in the same manner. The more similar the set of patches of the audio sample are to the set of patches of the reference sample, the more likely the audio sample and the reference sample are a match.

In another implementation, compressed patches can be used as additional discriminative information within descriptors in an audio matching system. For example, the index of the max(0,correlation) or the top P values (wherein "P" is an integer) in the hash can be included within a descriptor. In another implementation, a similarity (e.g., minhash) of the patch can be generated and included within a descriptor.

Figure 2:
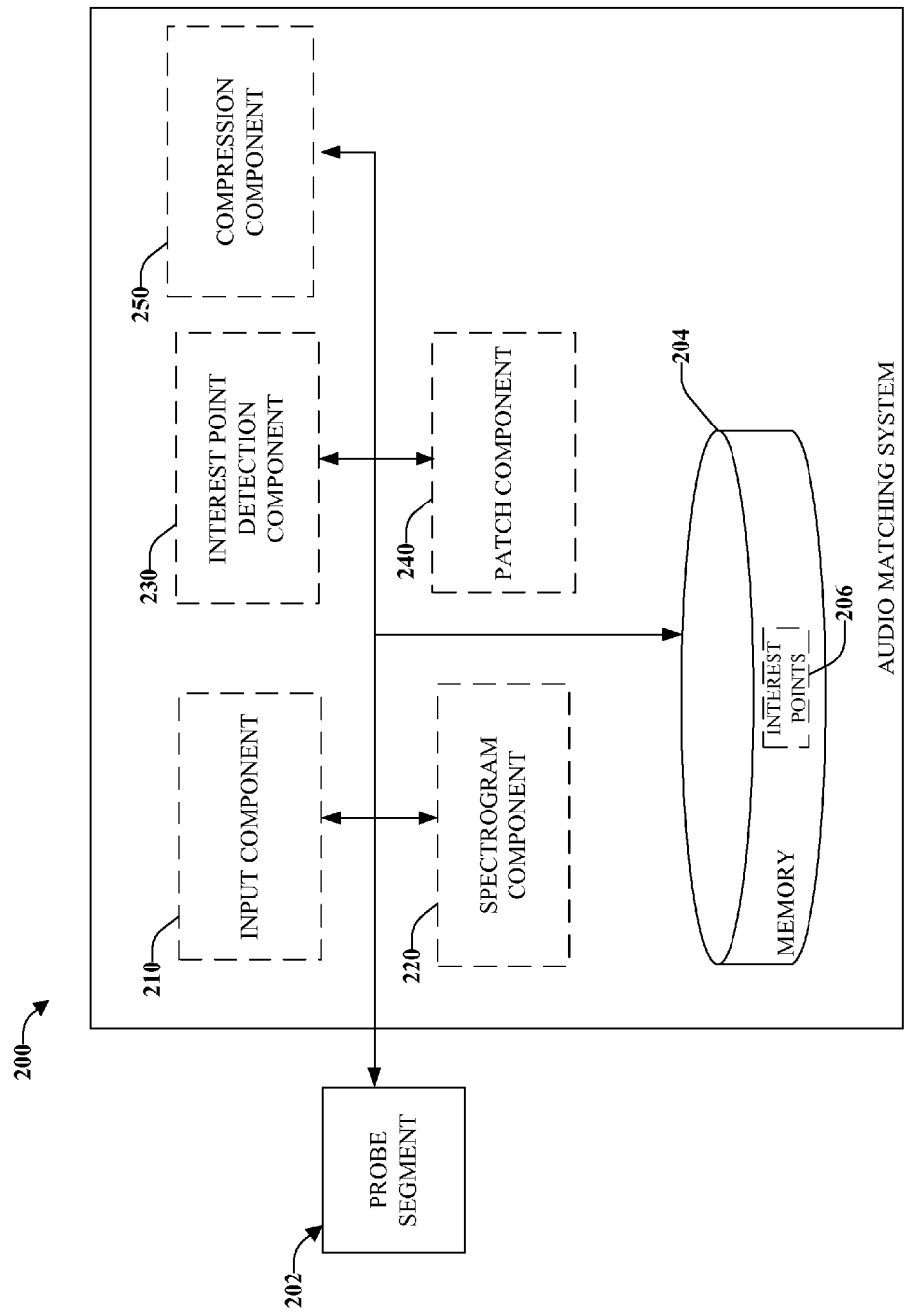
FIG. 2 illustrates a high-level functional block diagram of an example audio matching system in accordance with implementations of this disclosure.

Referring now to FIG. 2, there is illustrated a high-level functional block diagram of an example audio matching system in accordance with implementations of this disclosure. In FIG. 2, an audio matching system 200 includes an input component 210, a spectrogram component 220, an interest point detection component 230, a patch component 240, a compression component 250, and a memory 204, each of which may be coupled as illustrated. Input component 210 can receive an audio sample 202. A spectrogram component 220 can generate a spectrogram of the audio sample. In one implementation, spectrogram component 220 can generate the spectrogram by taking FFTs of half-overlapping windows of the audio signal.

An interest point detection component 230 can generate a set of interest points based on the spectrogram wherein interest points are local maxima over respective time/frequency windows of the spectrogram. Interest points in the set of interest points are associated with time and frequency positions. Interest point detection component 230 can store the set of interest points 206 within memory 204 for access by other components.

A patch component 240 can determine respective patches of the spectrogram associated with respective interest points in the set of interest points. In one implementation, a frequency boundary of the patch associated with respective interest points is based on the frequency position of the interest point.

A compression component 250 can compress respective patches associated with respective interest points in the set of interest points into a set of pixels. In one implementation, the compression component 250 can eliminate areas of the patch near the interest point for respective interest points in the set of interest points. For example, the middle rows and columns as depicted in patch 120 in FIG. 1 can be removed so that they are not a part of the compressed patch. It is to be appreciated that the set of pixels can be 8, 16, 32, or conceivably any amount.

Figure 3:
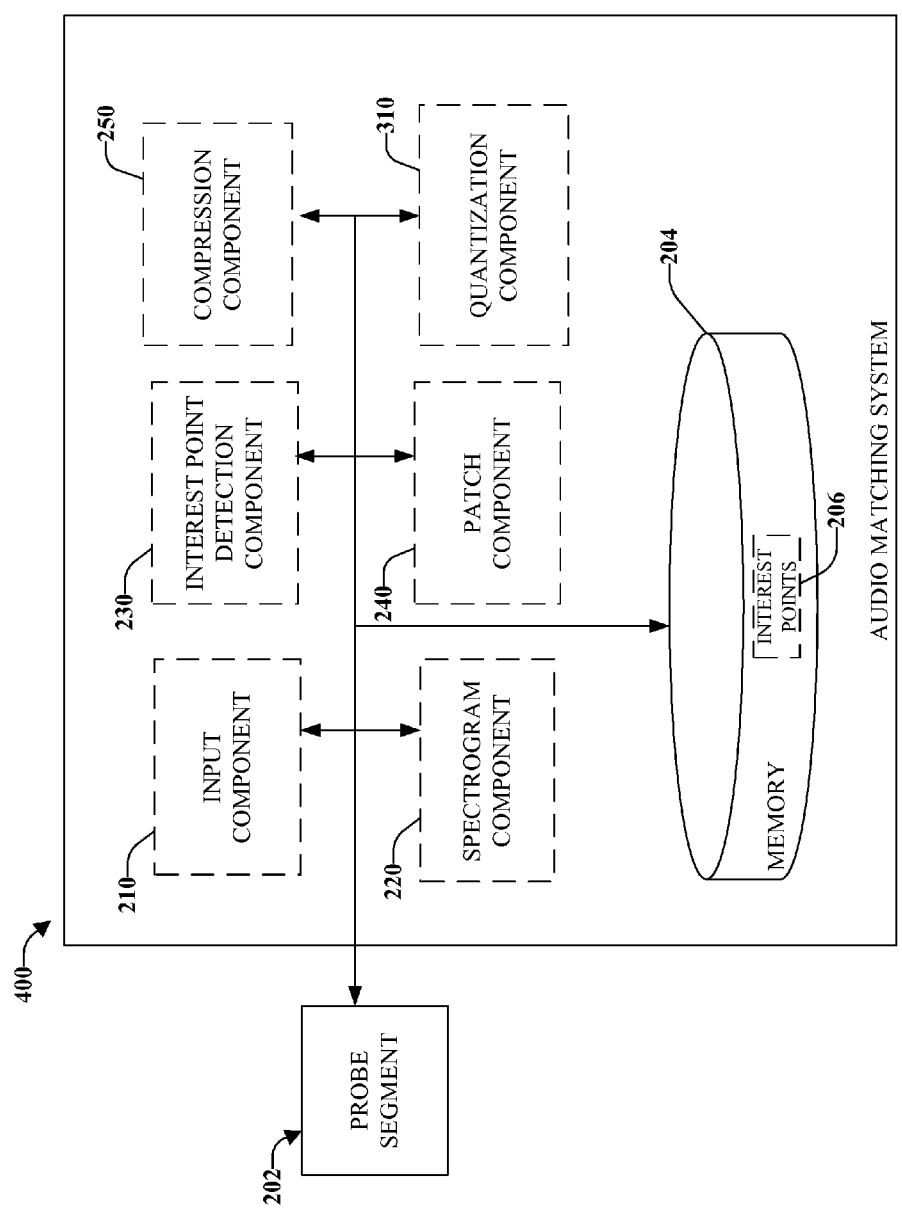
FIG. 3 illustrates a high-level functional block diagram of an example audio matching system including a quantization component in accordance with implementations of this disclosure.

Referring now to FIG. 3, there is illustrated a high-level functional block diagram of an example audio matching system including a quantization component 310 in accordance with implementations of this disclosure. Quantization component 310 can normalize and quantize the set of pixels based on a fixed number of bins. In one implementation, the fixed number of bins is 16.

In one implementation, compression component 250 can further compress respective patches associated with respective interest points in the set of interest points based on encoding the normalized and quantized set of pixels. For example, if the quantization component uses 16 bins, each pixel can be encoded using four bits. In another example, if 32 bins are used, each pixel can be encoded using five bits. It is to be appreciated that the greater the number of bins, the more discriminative the encoded pixels become. However, as the number of bins increases, the storage space needed to encode the bins increases, potentially affecting scalability of a system with millions of reference samples and billions of interest points and associated patches.

Figure 4:
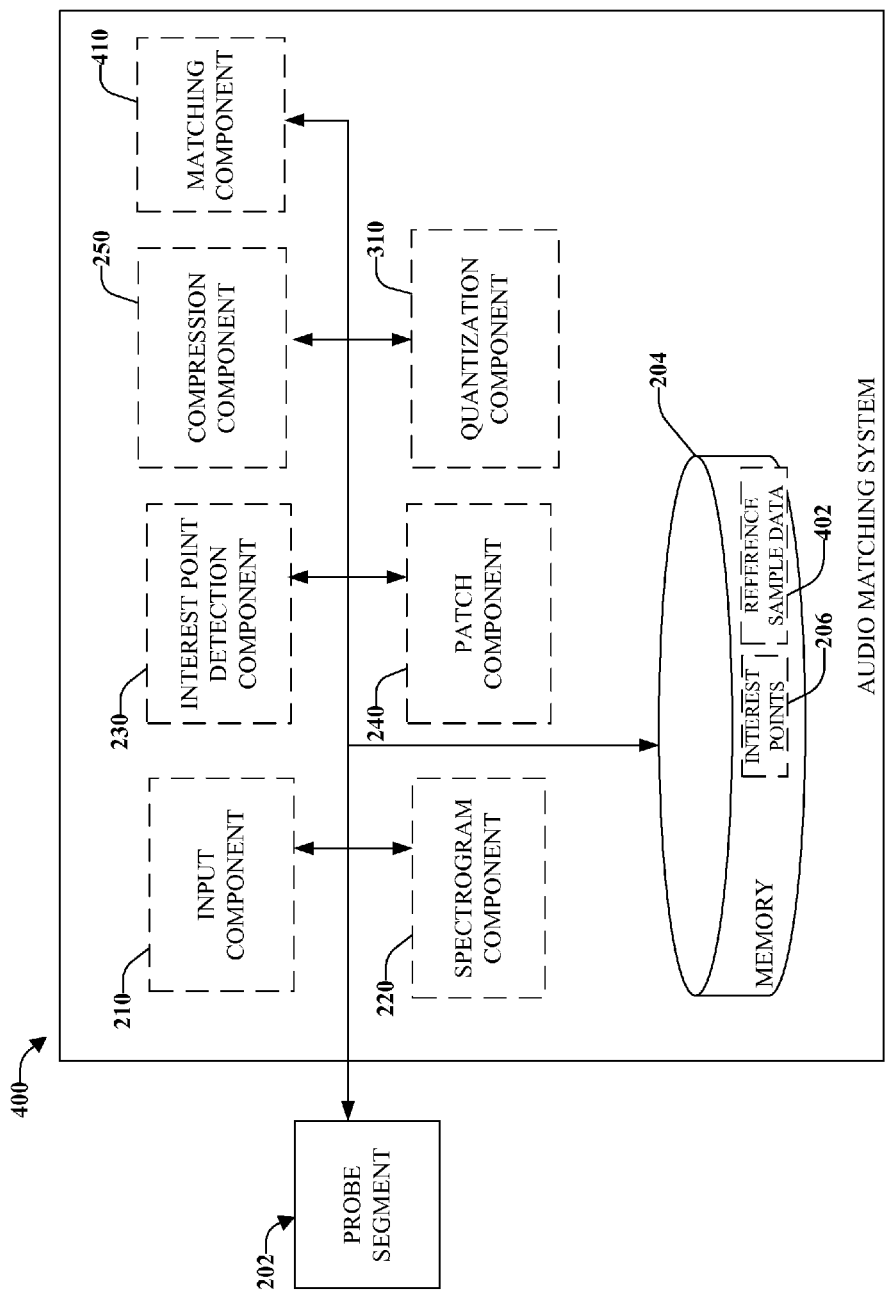
FIG. 4 illustrates a high-level functional block diagram of an example audio matching system including a matching component in accordance with implementations of this disclosure.

Referring now to FIG. 4, there is illustrated a high-level functional block diagram of an example audio matching system including a matching component 410 in accordance with implementations of this disclosure. Matching component 410 can identify the audio sample based on comparing respective interest points and associated set of compressed patches of the audio sample with set of interest points and associated sets of compressed patches related to a set of reference samples. In one implementation, matching component 410 compares interest points and associated sets of compressed patches by summing the similarities between sets of compressed patches related to the audio sample and sets of compressed patches related to a reference sample among the set of reference samples.

Figure 5:
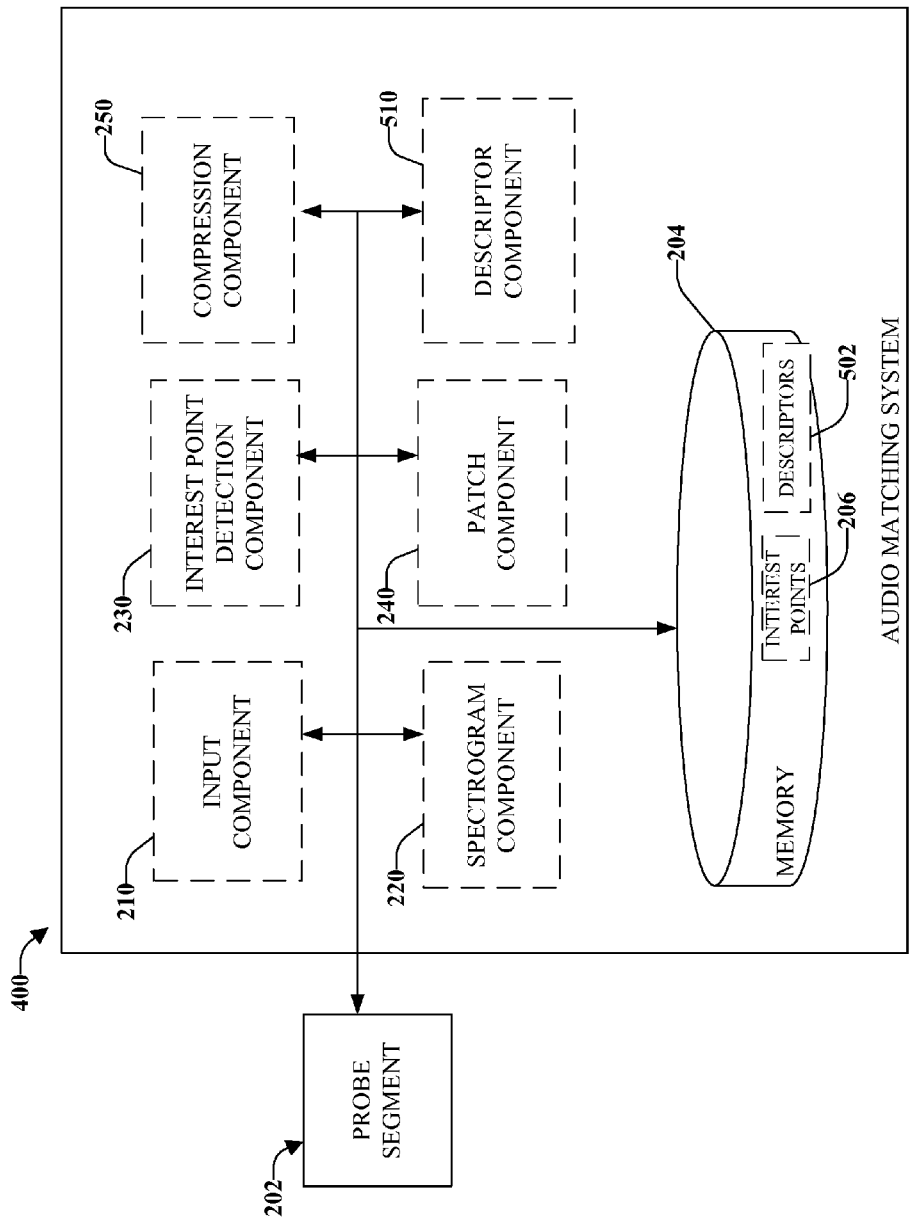
FIG. 5 illustrates a high-level functional block diagram of an example audio matching system including a descriptor component in accordance with implementations of this disclosure.

Referring now to FIG. 5, there is illustrated a high-level functional block diagram of an example audio matching system including a descriptor component 510 in accordance with implementations of this disclosure. Descriptor component 510 can generate a set of descriptors based on the set of interest points and associated set of compressed patches. It can be appreciated that descriptors comprising sets of interest points and associated sets of compressed patches can be generated for a set of reference samples and incorporated within a reference index.

Figure 6:
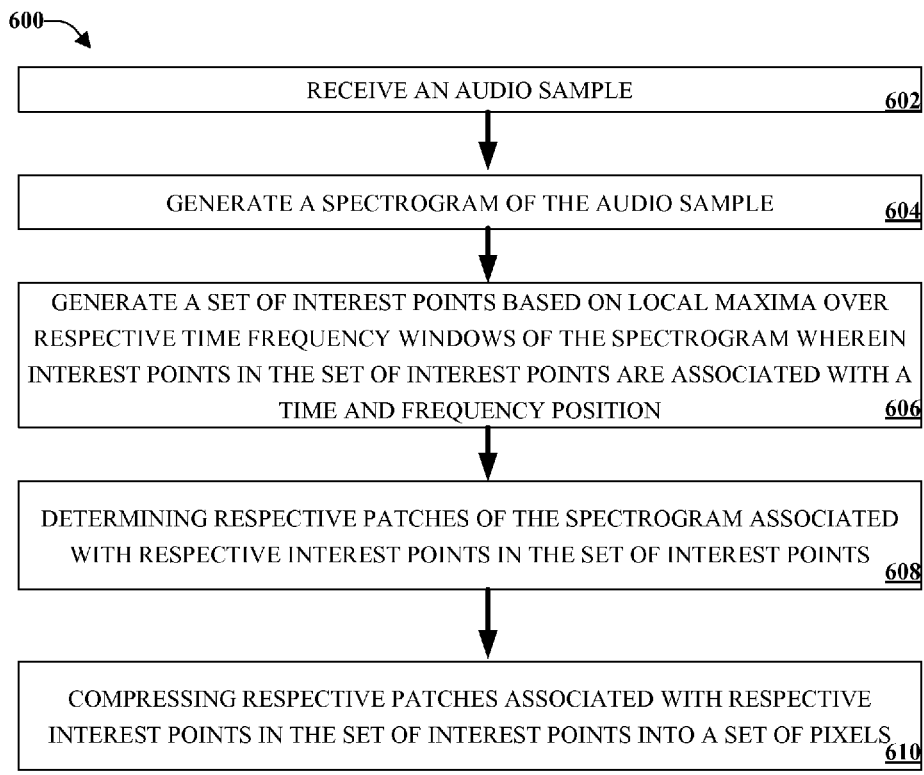
FIG. 6 illustrates an example method for audio matching in accordance with implementations of this disclosure.
Figure 7:
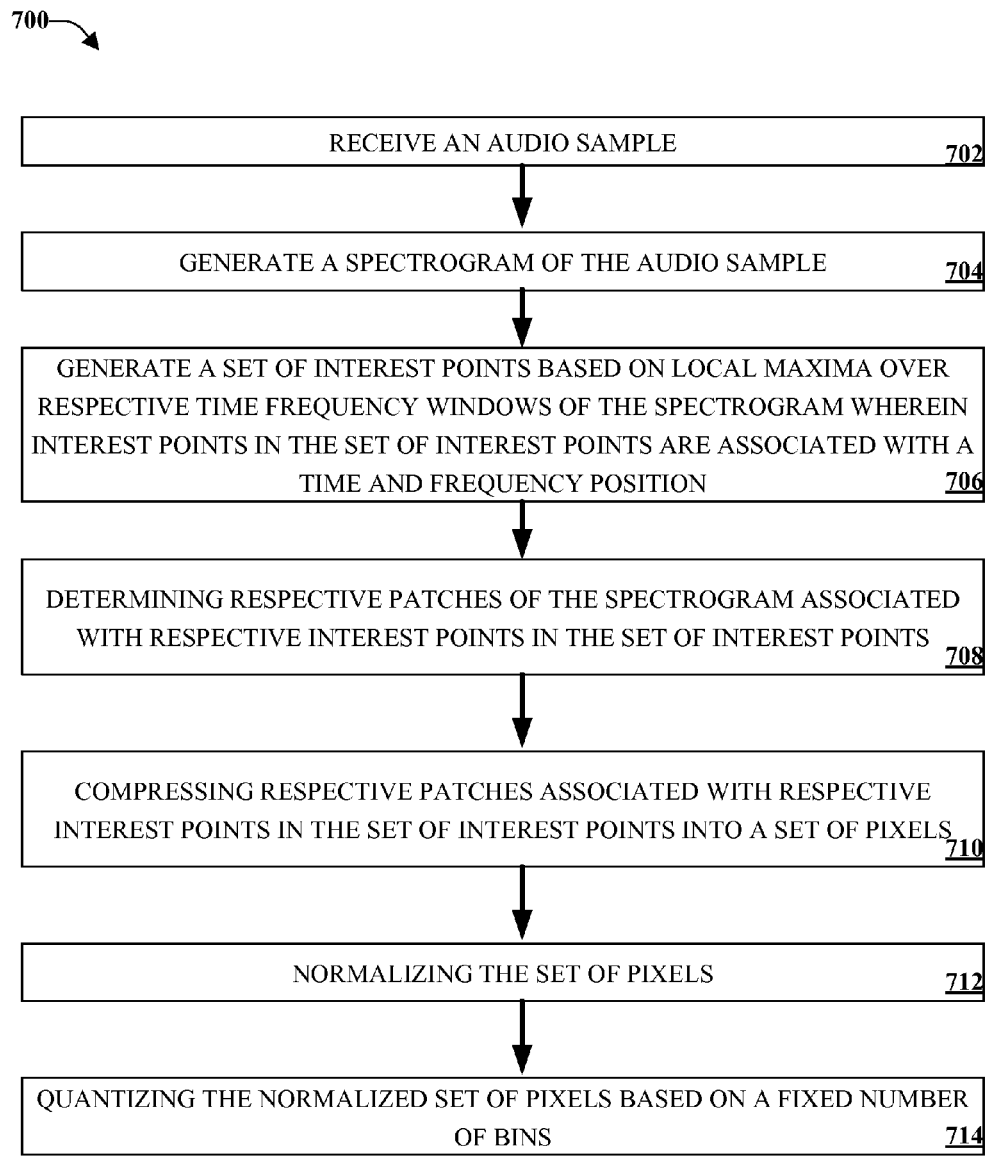
FIG. 7 illustrates an example method for audio matching including normalizing and quantizing a set of pixels in accordance with implementations of this disclosure.
Figure 8:
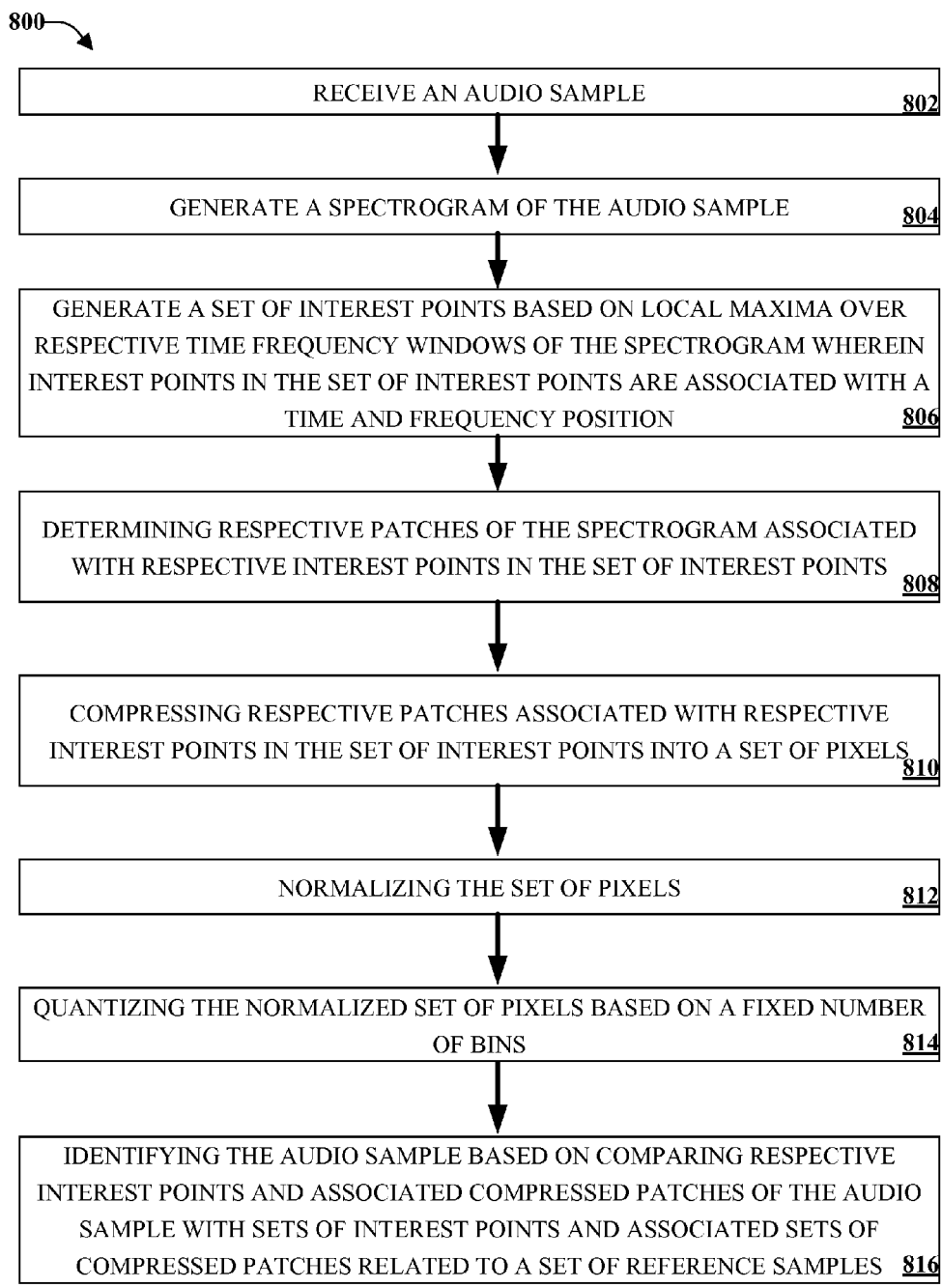
FIG. 8 illustrates an example method for audio matching including identifying an audio sample in accordance with implementations of this disclosure.

FIGS. 6-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 6 illustrates an example method for audio matching in accordance with implementations of this disclosure. At 602, an audio sample can be received (e.g., by an input component 210). At 604, a spectrogram of the audio sample can be generated (e.g., by a spectrogram component 220). At 606, a set of interest points can be generated (e.g., by an interest point detection component 230) based on local maxima over respective time/frequency windows of the spectrogram wherein interest points in the set of interest points are associated with time and frequency positions. At 608, respective patches of the spectrogram associated with respective interest points in the set of interest points can be determined (e.g., by a patch component 240). At 610, respective patches associated with respective interest points in the set of interest points can be compressed (e.g., by a compression component 250) into a set of pixels.

FIG. 7 illustrates an example method for audio matching including normalizing and quantizing a set of pixels in accordance with implementations of this disclosure. At 702, an audio sample can be received (e.g., by an input component 210). At 704, a spectrogram of the audio sample can be generated (e.g., by a spectrogram component 220). At 706, a set of interest points can be generated (e.g., by an interest point detection component 230) based on local maxima over respective time/frequency windows of the spectrogram wherein interest points in the set of interest points are associated with time and frequency positions. At 708, respective patches of the spectrogram associated with respective interest points in the set of interest points can be determined (e.g., by a patch component 240). At 710, respective patches associated with respective interest points in the set of interest points can be compressed (e.g., by a compression component 250) into a set of pixels. At 712, the set of pixels can be normalized (e.g., by a quantization component 310). At 714, the normalized set of pixels can be quantized (e.g., by a quantization component 310) based on a fixed number of bins.

FIG. 8 illustrates an example method for audio matching including identifying an audio sample in accordance with implementations of this disclosure. At 802, an audio sample can be received (e.g., by an input component 210). At 804, a spectrogram of the audio sample can be generated (e.g., by a spectrogram component 220). At 806, a set of interest points can be generated (e.g., by an interest point detection component 230) based on local maxima over respective time/frequency windows of the spectrogram wherein interest points in the set of interest points are associated with time and frequency positions. At 808, respective patches of the spectrogram associated with respective interest points in the set of interest points can be determined (e.g., by a patch component 240). At 810, respective patches associated with respective interest points in the set of interest points can be compressed (e.g., by a compression component 250) into a set of pixels. At 812, the set of pixels can be normalized (e.g., by a quantization component 310). At 814, the normalized set of pixels can be quantized (e.g., by a quantization component 310) based on a fixed number of bins. At 816, the audio sample can be identified (e.g., by a matching component 410) based on comparing respective interest points and associated compressed patches of the audio sample with sets of interest points and associated sets of compressed patches related to a set of reference samples.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances.

Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 9:
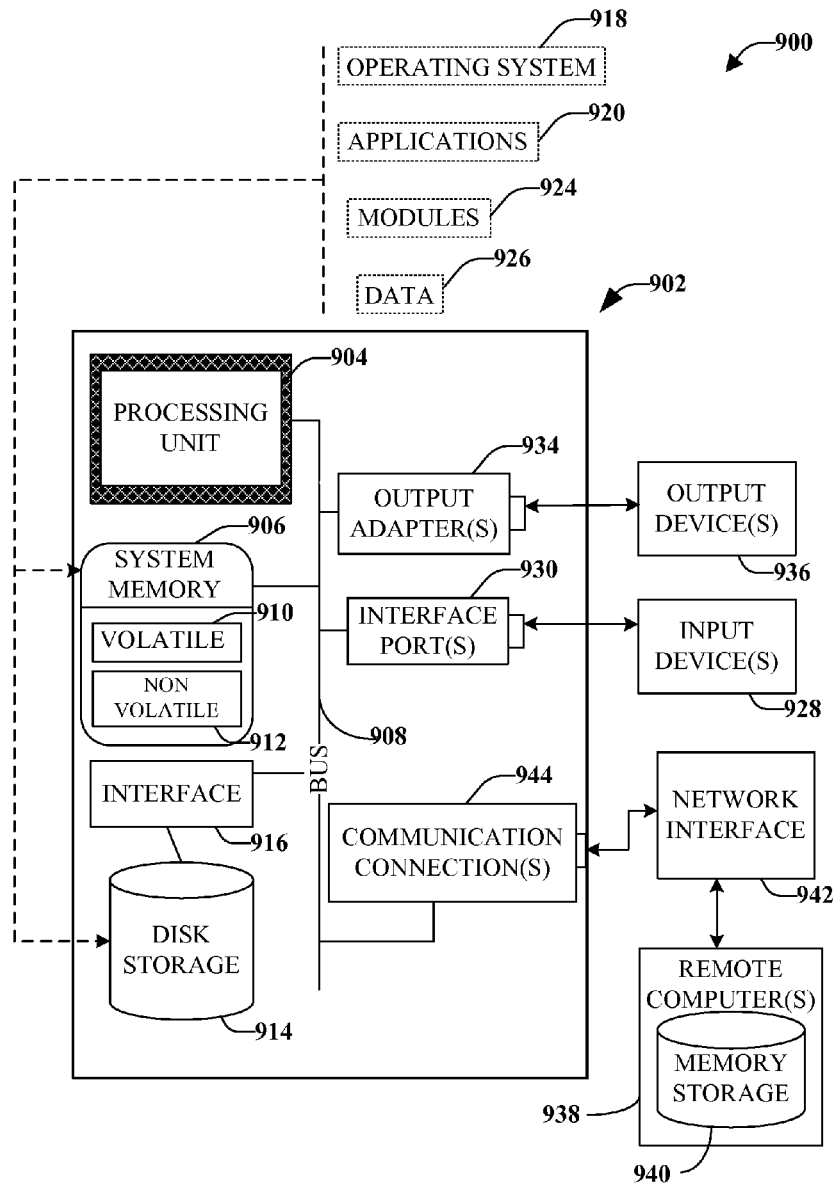
FIG. 9 illustrates an example block diagram of a computer operable to execute the disclosed architecture in accordance with implementations of this disclosure.

With reference to FIG. 9, a suitable environment 900 for implementing various aspects of the claimed subject matter includes a computer 902. It is to be appreciated that the computer, 902 can be used in connection with implementing one or more of the systems or components shown and described in connection with FIGS. 1-4. The computer 902 includes a processing unit 904, a system memory 906, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
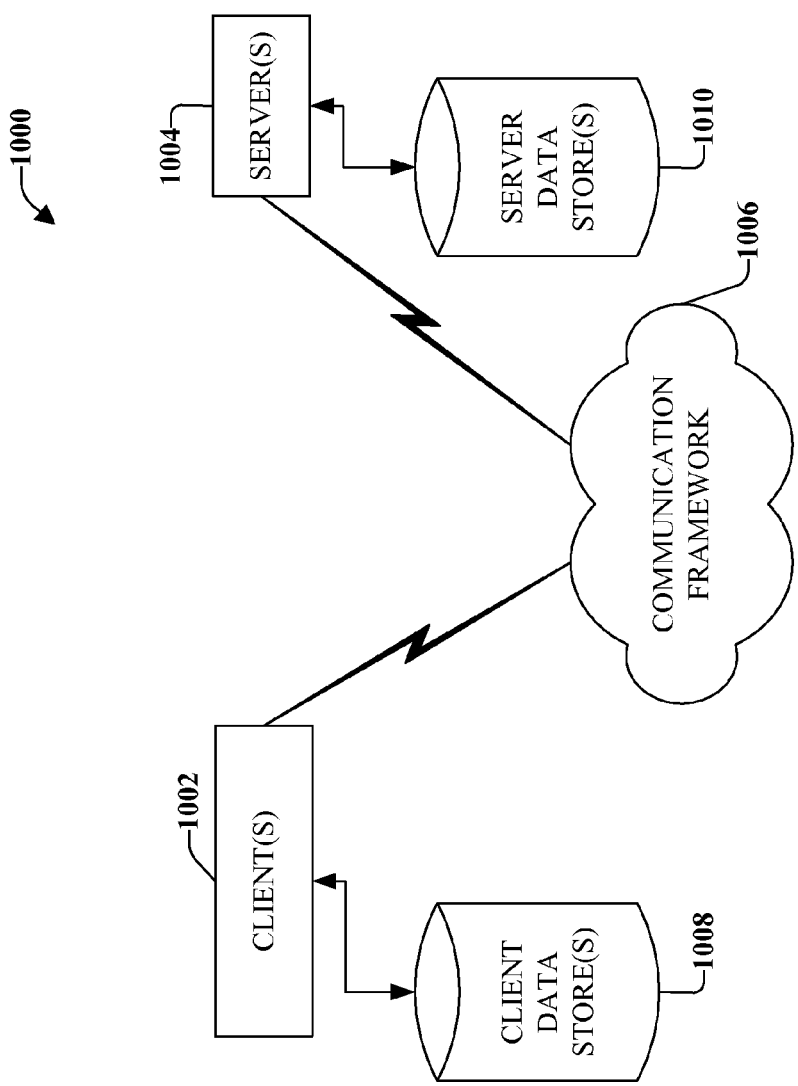
FIG. 10 illustrates an example schematic block diagram for a computing environment in accordance with implementations of this disclosure.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s), metadata, and/or associated contextual information and can also house threads to perform, for example, receiving an audio sample, generating a spectrogram, identifying interest points of a spectrogram, determining patches, quantizing, normalizing, encoding, comparing patches, etc. in accordance with the subject disclosure.

The system 1000 also includes one or more server(s) 1004. The server(s) 1004 can also be hardware or hardware in combination with software (e.g., threads, processes, computing devices). The servers 1004 can house threads to perform, for example, receiving an audio sample, generating a spectrogram, identifying interest points of a spectrogram, determining patches, quantizing, normalizing, encoding, comparing patches, etc. in accordance with the subject disclosure. One possible communication between a client 1002 and a server 1004 can be in the form of a data packet adapted to be transmitted between two or more computer processes where the data packet contains, for example, an audio sample or descriptors associated with an audio sample. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
    a memory that has stored thereon computer executable components; and
    a processor that executes the following computer executable components stored in the memory:
        an input component that receives an audio sample;
        a spectrogram component that generates a spectrogram of the audio sample;
        an interest point detection component that generates a set of interest points based on local maxima over respective time/frequency windows of the spectrogram, wherein interest points in the set of interest points are associated with respective time values and respective frequency values of the spectrogram;
        a patch component that determines respective patches of the spectrogram associated with interest points in the set of interest points, wherein a patch is a time and frequency window of the spectrogram surrounding an interest point;
        a compression component that compresses respective patches associated with interest points in the set of interest points into compressed patches comprising respective sets of pixels; and
        a matching component that identifies at least one reference audio sample that matches the audio sample based on comparing respective interest points and associated sets of compressed patches of the audio sample with sets of interest points and associated sets of compressed patches related to a set of reference audio samples.

2. The system of claim 1, wherein a size of a frequency dimension of the patch associated with an interest point is based on a frequency value of the interest point.

3. The system of claim 1, wherein the compression component eliminates an area of the patch of a specified size directly surrounding the interest point prior to compression of the patch, wherein the specified size is smaller than the time and frequency window of the spectrogram surrounding the interest point.

4. The system of claim 1, further comprising:
    a quantization component that normalizes and quantizes the sets of pixels based on a fixed number of bins.

5. The system of claim 4, wherein the fixed number of bins is 16.

6. The system of claim 4, wherein the compression component further compresses the respective patches associated with interest points in the set of interest points based on encoding the normalized and quantized sets of pixels.

7. The system of claim 2, wherein the size of the frequency dimension of the patch associated with the interest point is proportional to the frequency value of the interest point.

8. The system of claim 1, wherein the matching component compares interest points and associated sets of compressed patches by summing similarities between sets of compressed patches related to the audio sample and sets of compressed patches related to a reference audio sample among the set of reference audio samples.

9. The system of claim 1, further comprising:

a descriptor component that generates a set of descriptors based on the set of interest points and associated set of compressed patches.

10. A method comprising:
receiving, by a system including a processor, an audio sample;
generating a spectrogram of the audio sample;
generating a set of interest points based on local maxima over respective time/frequency windows of the spectrogram, wherein interest points in the set of interest points are associated respective time values and respective frequency values of the spectrogram;
determining respective patches of the spectrogram associated with interest points in the set of interest points, wherein a patch is a time and frequency window of the spectrogram surrounding an interest point;
compressing respective patches associated with interest points in the set of interest points into compressed patches comprising respective sets of pixels; and
identifying at least one reference audio sample that matches the audio sample based on comparing respective interest points and associated sets of compressed patches of the audio sample with sets of interest points and associated sets of compressed patches related to a set of reference audio samples.

11. The method of claim 10, wherein size of a frequency dimension of the patch associated with an interest point is based on a frequency value of the interest point.

12. The method of claim 10, further comprising eliminating an area of the patch of a specified size directly surrounding the interest point prior to compression of the patch, wherein the specified size is smaller than the time and frequency window of the spectrogram surrounding the interest point.

13. The method of claim 10, further comprising:
normalizing the sets of pixels; and
quantizing the normalized sets of pixels based on a fixed number of bins.

14. The method of claim 13, wherein the fixed number of bins are 16.

15. The method of claim 13, wherein the compressing the respective patches associated with interest points in the set of interest points is further based on encoding the normalized and quantized sets of pixels.

16. The method of claim 11, wherein the size of the frequency dimension of the patch associated with the interest point is proportional to the frequency value of the interest point.

17. The method of claim 16, wherein the comparing comprises summing similarities between sets of compressed patches related to the audio sample and sets of compressed patches related to a reference audio sample among the set of reference audio samples.

18. The method of claim 15, further comprising:
generating a set of descriptors based on the set of interest points and associated set of compressed patches.

19. A non-transitory computer-readable medium instructions stored thereon that, in response to execution, cause a system including a processor to perform operations, comprising:
receiving an audio sample;
generating a spectrogram of the audio sample;
generating a set of interest points based on local maxima over respective time/frequency windows of the spectrogram, wherein interest points in the set of interest points are associated respective time values and respective frequency values of the spectrogram;
determining respective patches of the spectrogram associated with interest points in the set of interest points, wherein a patch is a time and frequency window of the spectrogram surrounding an interest point;
compressing respective patches associated with respective interest points in the set of interest points into compressed patches comprising respective sets of pixels; and
identifying at least one reference audio sample that matches the audio sample based on comparing respective interest points and associated sets of compressed patches of the audio sample with sets of interest points and associated sets of compressed patches related to a set of reference audio samples.

20. A non-transitory computer-readable medium of claim 19, further comprising eliminating an area of the patch of a specified size directly surrounding the interest point prior to compression of the patch, wherein the specified size is smaller than the time and frequency window of the spectrogram surrounding the interest point.

21. A non-transitory computer-readable medium of claim 19, further comprising:
normalizing the sets of pixels; and
quantizing the normalized sets of pixels based on a fixed number of bins.

22. A non-transitory computer-readable medium of claim 19, wherein a size of a frequency dimension of the patch associated with the interest point is proportional to a frequency value of the interest point.

* * * * *